(12) United States Patent
Park et al.

(10) Patent No.: US 6,975,448 B2
(45) Date of Patent: Dec. 13, 2005

(54) AUTOMATIC GAIN CONTROLLER OF OPTICAL FIBER AMPLIFIER

(75) Inventors: Se-Hong Park, Seoul (KR); Sang-Ho Kim, Suwon-shi (KR); Kwan-Woong Song, Songnam-shi (KR); Seong-Taek Hwang, Pyongtaek-shi (KR); Tae-Sung Park, Yongin-shi (KR)

(73) Assignee: Samsung Electronics, Suwon-Si (KR)

( * ) Notice: Subject to any disclaimer, the term of this patent is extended or adjusted under 35 U.S.C. 154(b) by 171 days.

(21) Appl. No.: 10/719,140

(22) Filed: Nov. 21, 2003

(65) Prior Publication Data

US 2004/0240044 A1 Dec. 2, 2004

(30) Foreign Application Priority Data

May 28, 2003 (KR) ...................... 10-2003-0034056

(51) Int. Cl.[7] .............................................. H01S 3/00
(52) U.S. Cl. ................................ 359/341.1; 359/341.3
(58) Field of Search ........................... 359/341.1, 341.3

(56) References Cited

U.S. PATENT DOCUMENTS

| | | | |
|---|---|---|---|
| 6,366,395 B1 * | 4/2002 | Drake et al. ............ | 359/341.41 |
| 6,501,595 B1 * | 12/2002 | Drake et al. ............ | 359/341.43 |
| 6,690,506 B2 * | 2/2004 | Zahnley et al. ......... | 359/337.11 |

FOREIGN PATENT DOCUMENTS

JP            02000134156 A  *  5/2000  .......... H04B 10/14

* cited by examiner

Primary Examiner—Mark Hellner
(74) Attorney, Agent, or Firm—Cha & Reiter, LLC.

(57) ABSTRACT

An automatic gain controller for controlling gain values of an optical fiber amplifier. The automatic gain controller includes a first opto-electric conversion unit for converting a portion of optical signals that are input into the optical fiber amplifier into electrical signals to output the converted electrical signals. A second opto-electric conversion unit converts a portion of output optical signals output from the optical fiber amplifier into electrical signals and then outputs the converted electrical signals. A transient suppressing unit generates pulse typed waveforms when a change in channel number is generated during monitoring outputs of the first opto-electric conversion unit, and a comparing unit compares the sum of output signals of the transient suppressing unit and output signals of the first opto-electric conversion unit with output signals of the second opto-electric conversion unit. A control unit outputs pump control signals in response to the output signals of the transient suppressing unit and output signals of the comparing unit, and a first pumping light source unit supplies pumping light to the optical fiber amplifier in response to the inputting of the pump control signals.

16 Claims, 8 Drawing Sheets

US 6,975,448 B2

AUTOMATIC GAIN CONTROLLER OF OPTICAL FIBER AMPLIFIER

CLAIM OF PRIORITY

This application claims priority to an application entitled "Automatic Gain Controller for Optical Fiber Amplifier," filed in the Korean Intellectual Property Office on May 28, 2003 and assigned Serial No. 2003-34056, the contents of which are hereby incorporated by reference.

BACKGROUND OF THE INVENTION

1. Field of the Invention

The present invention relates to an optical fiber amplifier based on a wavelength division multiplexing system. More particularly, the present invention relates to an automatic gain controller of an optical fiber amplifier for making a gain per channel constant when the number of input channels is varied.

2. Description of the Related Art

In an optical transmission system, the rearrangement of networks, the adding/dropping of signal channels, as well as the failure of transmission lines and so forth are responsible for a change in the number of multiplexed channels available at a given instant of time. A change in the number of input channels in an optical fiber amplifier generated by any of the above-mentioned reasons (i.e., a change in input optical power) causes a reverse rate of density (population inversion) of an optical fiber, such as an erbium-doped optical fiber, as a determining factor of the momentary change in gain. In addition, the channels that survive in the optical fiber are subjected to a transient excursion of output power. This transient excursion of the output power is brought about by a nonlinear phenomenon in the optical fiber, or by reducing a signal-to-noise ratio to restrict a performance of the transmission system. In order to solve this problem, it has been proposed an automatic gain control optical fiber amplifier having a constant gain at all times regardless of a variable amount of input channels connected at a given instant of time. A considerable number of optical fiber amplifier products, to which an automatic gain control mode is provided as an additional function, mainly employ a mode in which a bias current of a pump laser diode (LD) is electrically controlled. The reason for this is because when compared with the automatic gain control optical fiber amplifier that is optically implemented, it is convenient to construct them, and that it is easy to implement them through a simple control circuit.

The mode in which the bias current of the pump LD in the optical fiber amplifier is controlled to implement the automatic gain control is generally exemplified by three modes, (1st) a feed forward mode, (2md) a feedback mode and a (3d) mode using a micro controller.

The feed forward mode performs automatic gain control in a manner in which a current is converted into a voltage, and then the voltage is directly applied to a bias current driver of a pump LD, wherein the current is then input through a pin photodiode (PIN-PD) connected on one side of an optical tap coupler located on an input side of an optical fiber amplifier. The feed forward mode has an advantage in that it has a rapid control speed and a simple circuit construction, but a disadvantage in that it is sensitive to a change in characteristics of optical/electronic devices used in the optical fiber amplifier, so that it is difficult to perform precise automatic gain control.

To secure a stability compared with the feed forward mode, the feedback mode is presently used in most of the automatic gain control optical fiber amplifiers.

FIG. 1 shows a construction of a conventional optical fiber amplifier using a feedback mode.

Referring to FIG. 1, the feedback mode causes a current input through a PIN-PD 3 connected on one side of an optical tap coupler 2 located on an output side of an optical fiber amplifier to be converted into a voltage (TIA2; 4), and then feeds the converted voltage back to a "+" (i.e. non-inverting) terminal of a differential amplifier 5. Normally, a value of the converted voltage refers to a present value or a real value. There is a comparison of a reference value (i.e., a value of a voltage proportional to the number of the channels into which a voltage converted by a PIN-PD on an input side of an optical fiber amplifier is applied) input into a "−" (i.e. inverting) terminal of the differential amplifier with a fed back present value, PI (Proportional & Integral) controller 6 is operated until these two values become equal to each other, and controls a pump LD driver 8 which outputs a bias current for driving a pump LD 7.

In addition, with regard to FIG. 1, reference numerals, 2, 3 and 4 refer to an optical tap coupler located on the input side of the optical fiber amplifier, the PIN-PD and a TIA1 (Trans Impedance Amplifier 1) respectively, 9 refers to an adder, 10 is a transient suppressor for suppressing a transient phenomenon, and 11 is a gain amplifier.

However, as shown in FIGS. 2 and 3, PI control of the conventional feedback mode is characterized in that, as a variation of the number of input channels active on the input side of the optical fiber amplifier is increased, both a transient power excursion and a transient response time are deteriorated. In other words, as a variation of input optical power increases, both the transient power excursion and transient response time is increased. Accordingly, a time constant allowing for optimization of the transient phenomenon must be set whenever conditions of input channels are changed. For this reason, the PI control requires a separate suppressing method.

FIG. 2 is a graph showing a variation of optical power of survival channels in an optical fiber according to a change of the channels when a time constant is 10 $\mu$s, and FIG. 3 is a graph showing a variation of optical power of survival channels in an optical fiber according to a change of the channels when a time constant is 74 $\mu$s. When the time constant is set from 10 $\mu$s (FIG. 2) to 74 $\mu$s (FIG. 3), while it can be seen that a phenomenon of the transient power excursion A is ameliorated to a certain extent, but the transient response time B is actually lengthened.

Meanwhile, the micro controller mode performs control in a manner that carries out a PI operation in a micro controller, and then transmits the operated result to a bias current driver through a digital/analog (D/A) converter. However, the conventional commercialized micro controller mode has an internal operational processing speed that is an important parameter thereby limiting speed control of the transient phenomenon of the optical amplifier by means of the micro controller.

SUMMARY OF THE INVENTION

Accordingly, the present invention has been made in part a s a solution to at least some of the above-mentioned problems occurring in the prior art.

According to a first aspect of the present invention, an automatic gain controller of an optical fiber amplifier is provided with design that minimizes a transient response characteristic even when there is a change in the number of input channels input from the optical fiber amplifier.

According to another aspect of the present invention, an automatic gain controller of an optical fiber amplifier is provided that outputs transient suppressing signals in order to minimize a transient response characteristic of the optical fiber amplifier. The automatic gain controller comprises: a first opto-electric conversion unit for converting into electrical signals a portion optical signals input into the optical fiber amplifier and to output the converted signals; a second opto-electric conversion unit for converting some of the optical signals output to the optical fiber amplifier into electrical signals and to output the converted signals; a transient suppressing unit for generating pulse typed waveform is when a change in channel number is generated during monitoring outputs of the first opto-electric conversion unit; a comparing unit for comparing the sum of output signals of the transient suppressing unit and output signals of the first opto-electric conversion unit with output signals of the second opto-electric conversion unit; a controlling unit for outputting pump control signals in response to the output signals of the transient suppressing unit and output signals of the comparing unit; and a first pumping light source unit for supplying pumping light to the optical fiber amplifier in response to the inputting of the pump control signals.

Preferably, the automatic gain controller may further comprise a second pumping light source unit for providing a fixed bias current to the optical fiber amplifier.

More preferably, the automatic gain controller may further comprise a micro control unit for compensating offsets caused by power of amplified spontaneous emission, depending on a change in input power of the optical fiber amplifier or a change in temperature.

Furthermore, according to a second aspect of the present invention, there is provided an automatic gain controller of an optical fiber amplifier, comprising: an optical amplifying fiber unit, provided with first and second optical fiber amplifiers, for amplifying input optical signals; a first opto-electric conversion unit for converting a portion of the inputted optical signals into electrical signals to output the converted signals; a second opto-electric conversion unit for converting some optical signals outputted into the optical fiber amplifying unit into electrical signals to output the converted signals; a first pumping light source unit for supplying a fixed bias current to the first optical fiber amplifier in response to inputting of pump control signals; a transient suppressing unit for generating pulse typed waveforms when a change in channel number is generated during monitoring outputs of the first opto-electric conversion unit; a comparing unit for comparing sum of output signals of the transient suppressing unit and output signals of the first opto-electric conversion unit with output signals of the second opto-electric conversion unit; a controlling unit for outputting the pump control signals in response to the output signals of the transient suppressing unit and output signals of the comparing unit; and a second pumping light source unit for providing pumping light to the second optical fiber amplifier in response to the inputting of the pump control signals.

According to the present invention, a method for automatic gain control of an optical fiber amplifier that outputs transient suppressing signals in order to minimize a transient response characteristic, comprises the steps of: (a) converting into a first group of electrical signals a first portion of optical signals input into the optical fiber amplifier and outputting the first group of electrical signals; (b) converting into a second group of electrical signals a first portion of optical signals output from the optical fiber amplifier and to output the second group of electrical signals; (c) generating pulse-type waveforms when a change in channel quantity is generated during monitoring outputs of the first group of electrical signals; (d) comparing the pulse-type waveforms generated in step (c) with the first group of electrical signals from step (a) and the second group of electrical signals from step (b); (e) outputting pump control signals in response to the comparison performed in step (d); and (f) supplying pumping light to the optical fiber amplifier in response to the outputting of the pump control signals in step (e).

BRIEF DESCRIPTION OF THE DRAWINGS

The above and other objects, features and advantages of the present invention will be more apparent from the following detailed description taken in conjunction with the accompanying drawings, in which.

DETAILED DESCRIPTION OF THE PREFERRED EMBODIMENT

Figure 1:
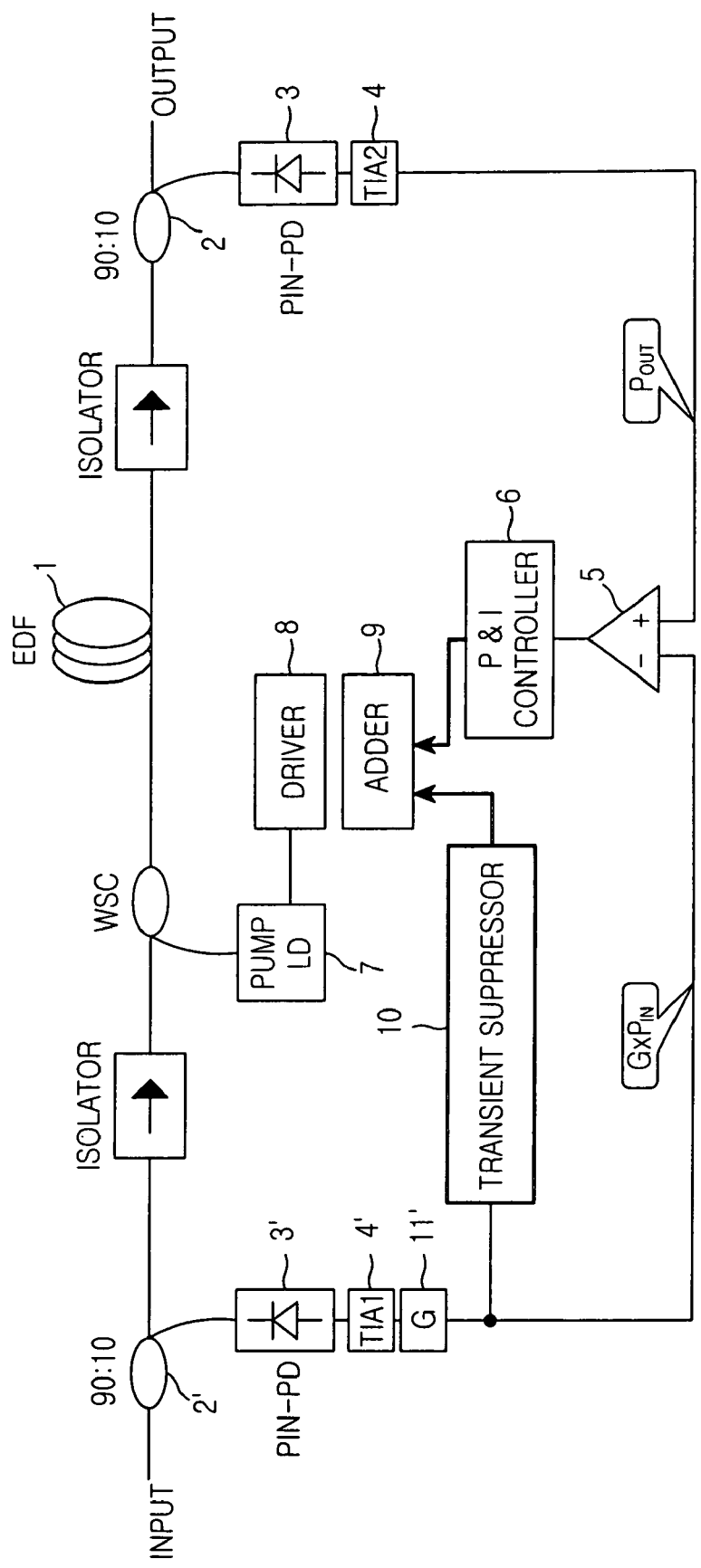
FIG. 1 shows a construction of the conventional optical fiber amplifier using a feedback mode.

Hereinafter, preferred aspects of the present invention will be described in detail with reference to the accompanying drawings. Above all, it should be noted that similar parts are given reference numerals and symbols as similar as possible throughout the drawings. In the description of the present invention, a detailed description of known functions and configurations incorporated herein will be omitted when it may obscure the subject matter of the present invention with needless detail known to a person of ordinary skill in the art.

Figure 4:
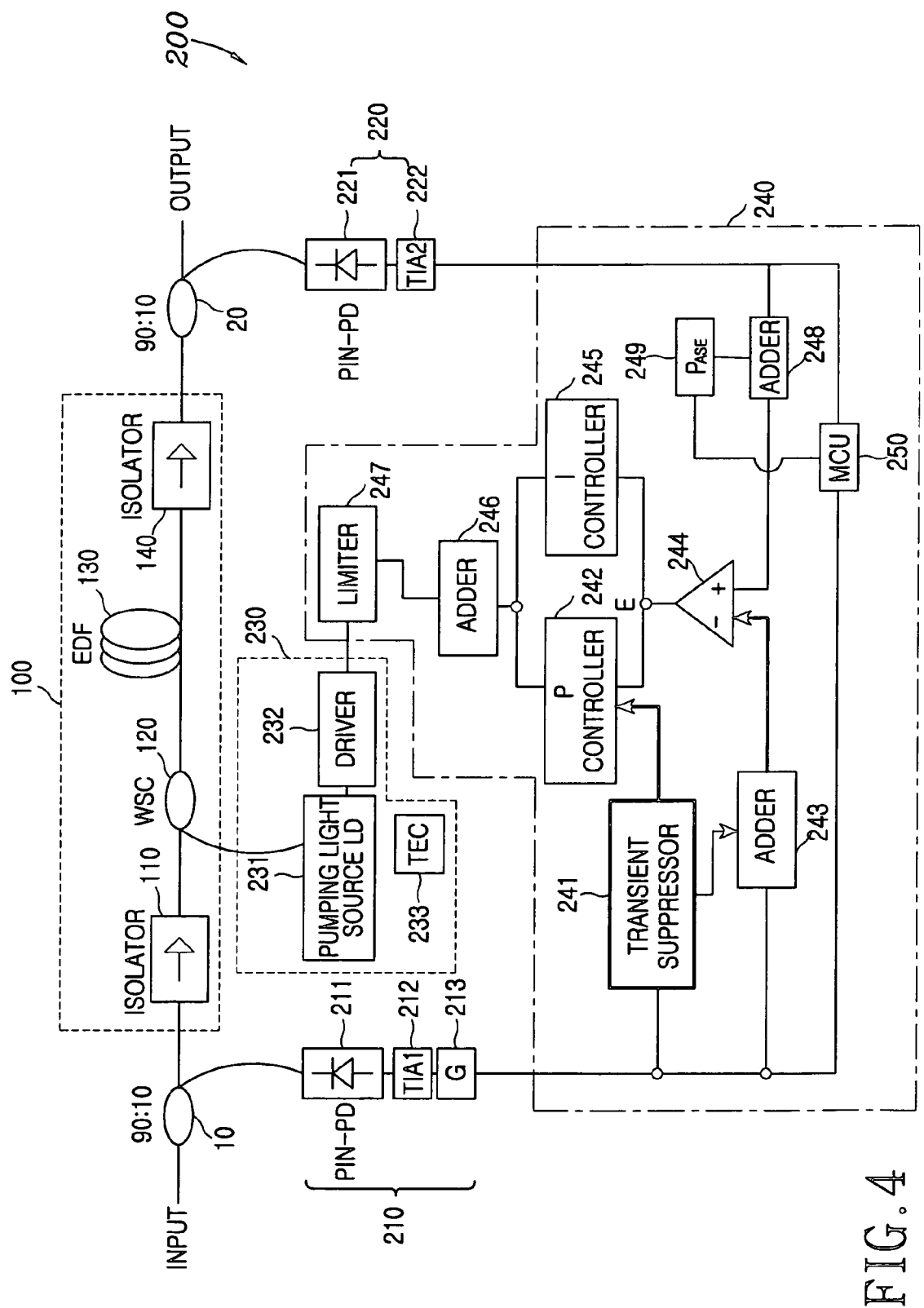
FIG. 4 shows a construction of an automatic gain controller of an optical fiber amplifier according to a first aspect of the present invention.

FIG. 4 shows a construction of an automatic gain controller of an optical fiber amplifier according to a first aspect of the present invention.

In accordance with the present invention, the automatic gain controller (AGC) of an optical fiber amplifier has a built-in transient suppressor generally comprises an amplifying unit 100 and an automatic gain controlling unit 200.

The amplifying field 100 amplifies and outputs the input optical signals, the power of which is divided by a first optical coupler 10 on an input side, and includes a first optical isolator 110, a WSC (Wavelength Selective Coupler) 120, an EDF (Erbium-Doped optical Fiber) 130 and a second optical isolator 140. The first and second optical isolators 110,140 allow the optical signals to proceed in a direction reverse to their output directions to a minimal extent. Here, such a reverse light direction refers to pumping light, reflective light and so forth. The WSC 120 combines output light from a pump 231 and signals inputted from the input side of the amplifying field 100 to form one signal. The EDF 130 amplifies and outputs the inputted signal using an stimulated emission effect of excited erbium ions. In this case, an amplification gain is adjusted by controlling an intensity of the inputted pumping light.

The automatic gain controlling field 200 performs a control function to have a constant gain at any time regardless of a change in the number of input channels, and includes a first opto-electric conversion unit 210, a second opto-electric conversion unit 220, a pumping light source unit 230 and a controlling unit 240.

The first opto-electric conversion unit 210 includes a first PIN-PD 211, which allows optical power, is split by the first optical coupler 10, to be input and causes a current proportional to the inputted optical power to flow. The first TIA1 212, which converts the current into a voltage, and a gain amplifier 213, which amplifies it by a value of a gain G corresponding to an optical gain of the optical fiber amplifier, may comprise an erbium-doped fiber amplifier (EDFA).

The second opto-electric conversion unit 220 converts optical signals, whose power is split by the second optical coupler 20 located on an output side of the amplifying field 100, into electrical signals and outputs the converted signals, and includes a second PIN-PD 221 and a second TIA2 222.

The pumping light source unit 230 comprises a pumping light source 231 for outputting pumping light having a particular wavelength, a pumping light source driver 232 for outputting a bias current for driving the pumping light source, and a TEC 233 for causing the pumping light source 231, which is implemented as a laser diode, a laser emitting light diode or the like, to perform stable operation regardless of an external temperature.

The controlling unit 240 functions to control the pumping light source unit 230 so that both an output value of the first opto-electric conversion unit 210 and an output value of the second opto-electric conversion unit 220 are constantly maintained. The controlling unit 240 comprises a transient suppressor 241, a proportional (P) controller 242, first to third adders 243, 246 and 248, a differential amplifier 244, an integral (I) controller 245, and a limiter 247. In addition, the controlling unit 240 further comprises a micro controller unit (MCU) 250 in order to compensate power of amplified spontaneous emission (ASE) according to a change in temperature at a $P_{ASE}$ 249.

The present invention having the foregoing construction may operate as follows.

Referring to FIG. 4, when optical signals are inputted through the input side of the amplifying field 100, the first optical coupler 10 splits the inputted optical signals at a ratio of 10 to 90. The optical signals having a fraction of 90% are inputted into the WSC 120 through the first isolator 110, while the signals having a fraction of 10% are inputted into the PIN-PD 211 of the first opto-electric conversion unit 210. The PIN-PD 211 allows a current proportional to optical power of the input optical signals to flow and to be converted into a voltage while the current passes through the TIA1 212, a current/voltage converter. A value of the voltage converted by the TIA1 212 is multiplied by a gain G corresponding to the optical gain of the optical fiber amplifier by the gain amplifier 213. Similarly, a current that flows through the PIN-PD 221 of the second opto-electric conversion unit 220 located on the output side of the amplifying field 100 is converted into a voltage past the TIA2 222.

The outputs of the first opto-electric conversion unit 210 are input into the transient suppressor 241 and the first adder 243. The transient suppressor 241 consists of a differentiator for outputting a pulse typed wave, in particular when the number of the channels is changed, during monitoring the outputs of the first opto-electric conversion unit 210.

Figure 5:
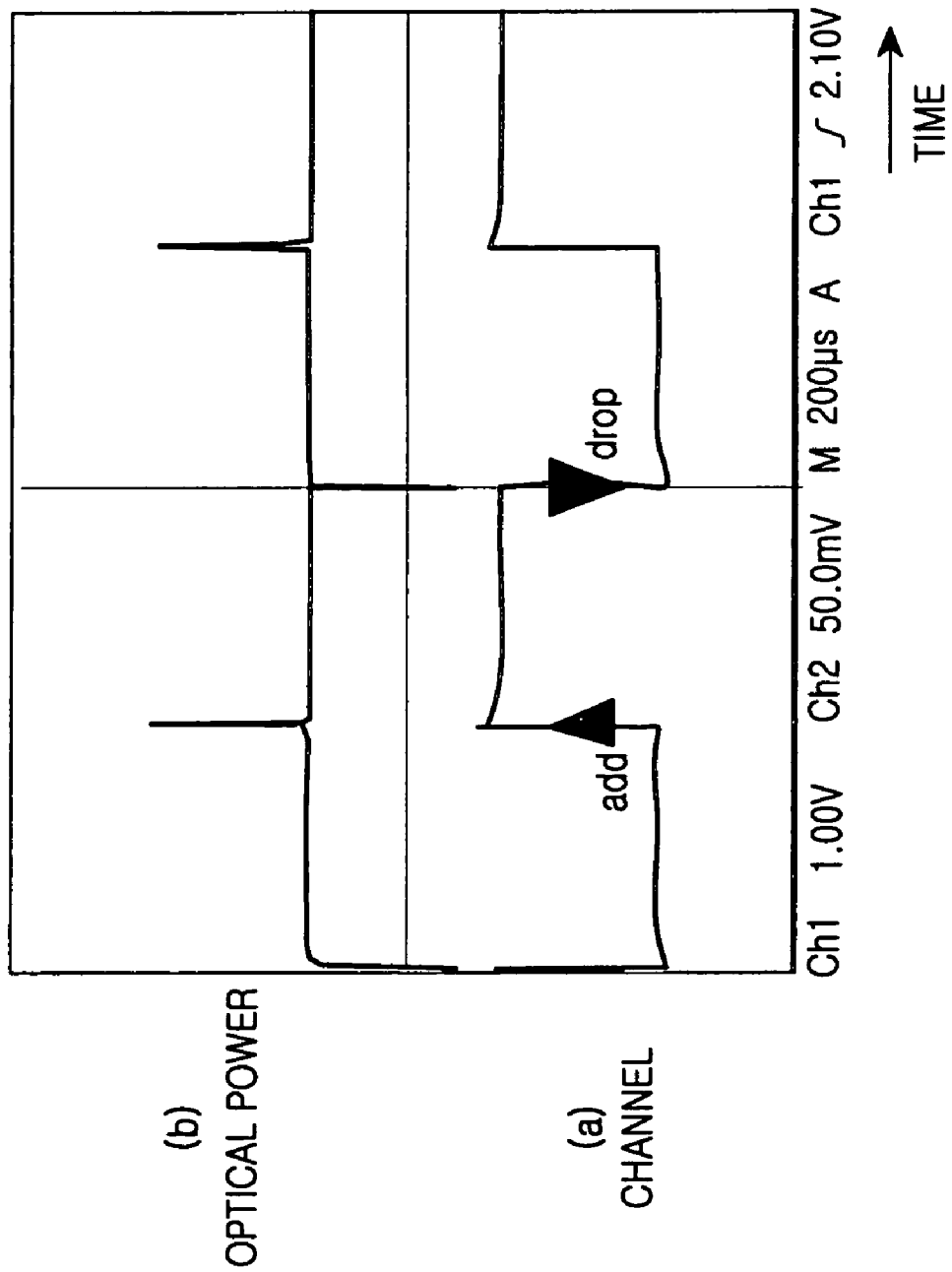
FIG. 5 shows wave forms (FIG. 5(b)) generated by the transient suppressor when the number of inputted channels is changed (FIG. 5(a))

FIGS. 5(a) and 5(b) shows wave forms (FIG. 5(b)) generated by the transient suppressor 241 when the number of the channels is changed (FIG. 5(a)). Here, a time constant ($\tau$=R×C) of the differentiator is set into 10 μs so as to allow for a proper operation relative to the conditions of all input power.

In this manner, of the two wave forms that are generated from the transient suppressor 241 (FIG. 4), one is inputted into the P controller 242, and the other is inputted into the "−" terminal of the differential amplifier 244 through the first adder 243, together with the outputs of the first opto-electric conversion unit 210. As a result, a greater error signal E (FIG. 4, FIG. 5 as evidenced by the spike in FIG. 5) is momentarily generated at the output of the differential amplifier 244, and also functions to strongly operate the P controller 242. The signal inputted into the P controller performs a function similar to this error signal E.

Figure 6:
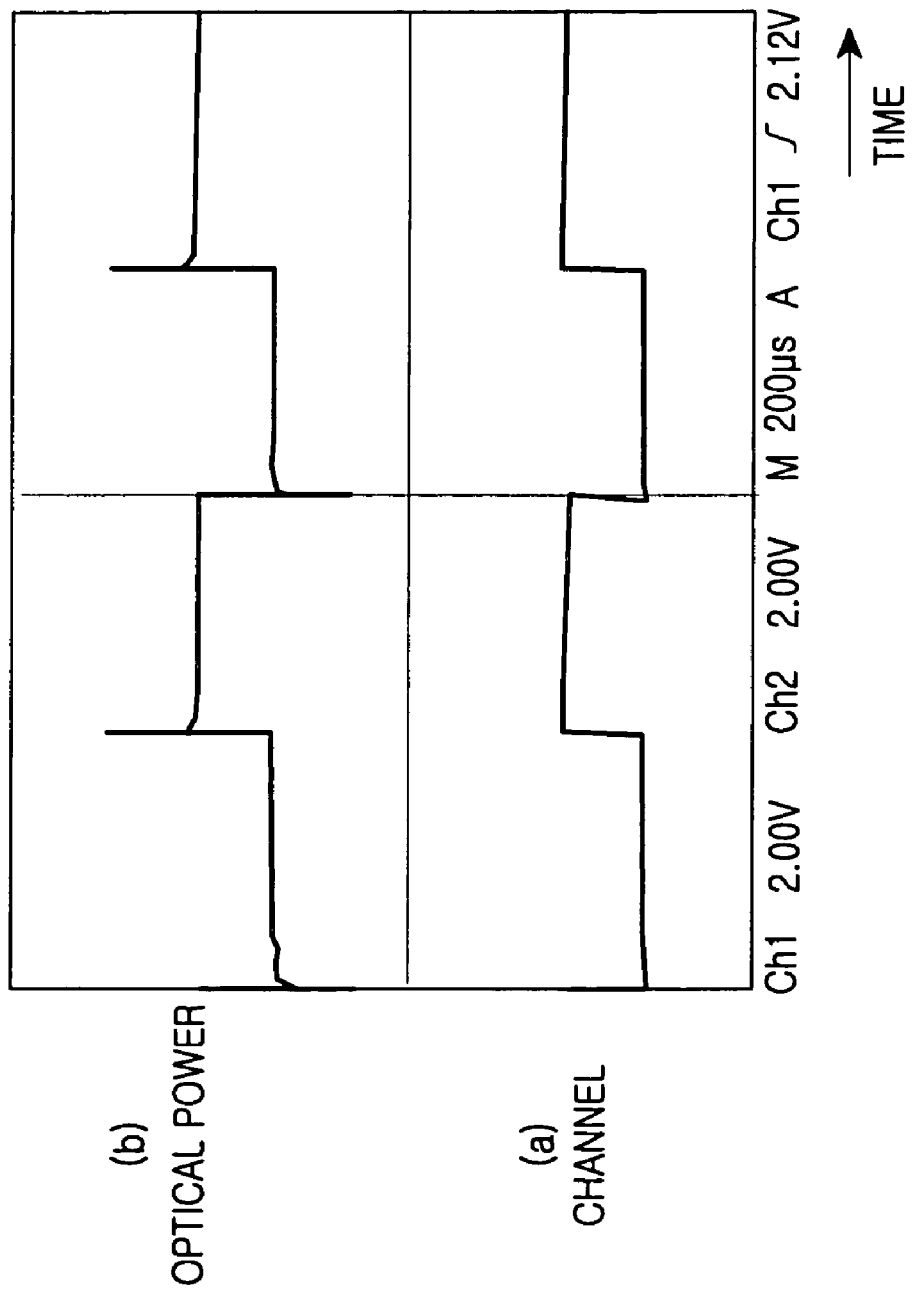
FIG. 6 shows wave forms (FIG. 6(b)) after signals pass through the first adder when the number of inputted channels is changed (FIG. 6(a))

FIG. 6 shows wave forms (FIG. 6(b)) after signals pass through the first adder 243 when the number of the channels is changed (FIG. 6(a)). The P controller 242 and the I controller 245 are operated so that the error signal E becomes 0 (zero). A pump control signal is outputted by a signal passing through the second adder 246, so that a gain control is performed. The control signal is then input through the limiter 247 into the pumping light source driver 232 of the pumping light source unit 230 and outputs a bias current for driving the pumping light source 231. The pumping light source 231 generates optical signals having particular wavelengths according to the bias current. The generated optical signals are combined with the input optical signals (i.e., 90% optical signals) by the WSC 120, so that they are incidented into the EDF 130.

Meanwhile, when a variation of the input power is increased (or, when the number of remaining survival channels is small), or when a temperature is changed, an effect caused by ASE power is increased as well, so that a gain offset is generated. In this case, the gain offset must be compensated after a certain reference value is set. To this end, the $P_{ASE}$ 249 and the MCU 250 are to be provided additionally. The MCU 250 is designed to receive values of inputted and outputted voltages at a real time through a built-in analog to digital converter (not shown). When a change in temperature is generated, it is checked through a built-in temperature sensor the degree of temperature change compared with the reference value set at 25° C., and then an internal operation or calculation is carried out. The resultant value (varied fraction) is outputted to the $P_{ASE}$ 249 through a built-in digital to analog converter (not shown). The $P_{ASE}$ 249 functions to compensate the gain offset which is generated by the ASE power on the basis of 25° C.

Figure 7:
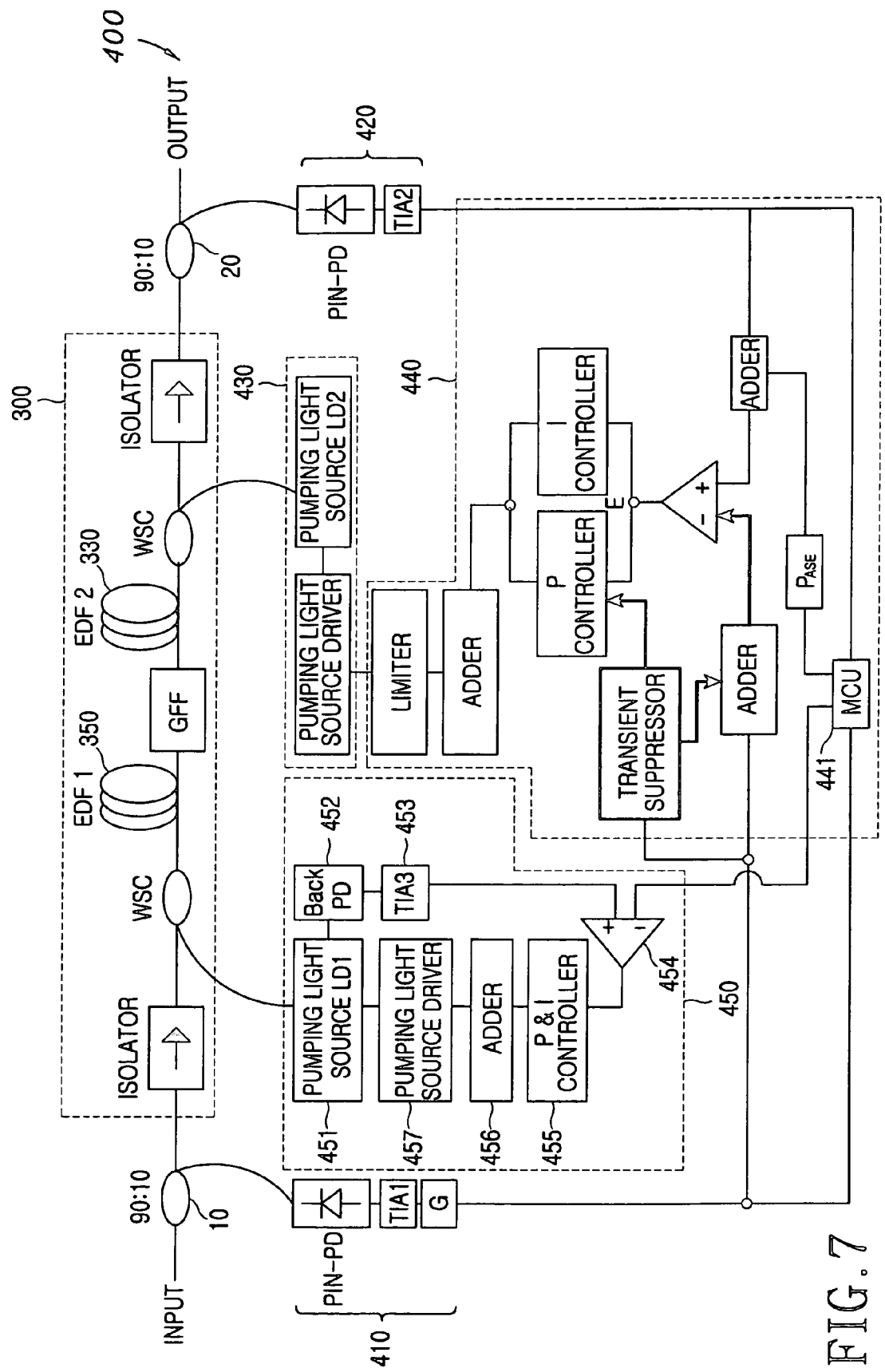
FIG. 7 shows a construction of an automatic gain controller of an optical fiber amplifier according to a second aspect of the present invention.

FIG. 7 shows a construction of an automatic gain controller of an optical fiber amplifier according to a second embodiment of the present invention. The second embodiment has a two pump control structure including a first pump and a second pump. Like the foregoing first aspect, a second aspect of the invention is comprised of an amplifying unit 300 and an automatic gain controlling unit 400, and further comprises both a second EDF 350 and a second pumping light source unit 450 for performing two pump control, in addition to components of the first embodiment. In the description of construction and operation of the second embodiment, only a description of the two pump control structure will be made in order to avoid repetition.

Referring to FIGS. 4 and 7, a first pumping light source unit 430 is used for an automatic gain control similar to the pumping light source unit 230 of FIG. 4, while a second pumping light source unit 450 is used to generate a fixed bias current.

Figure 8:
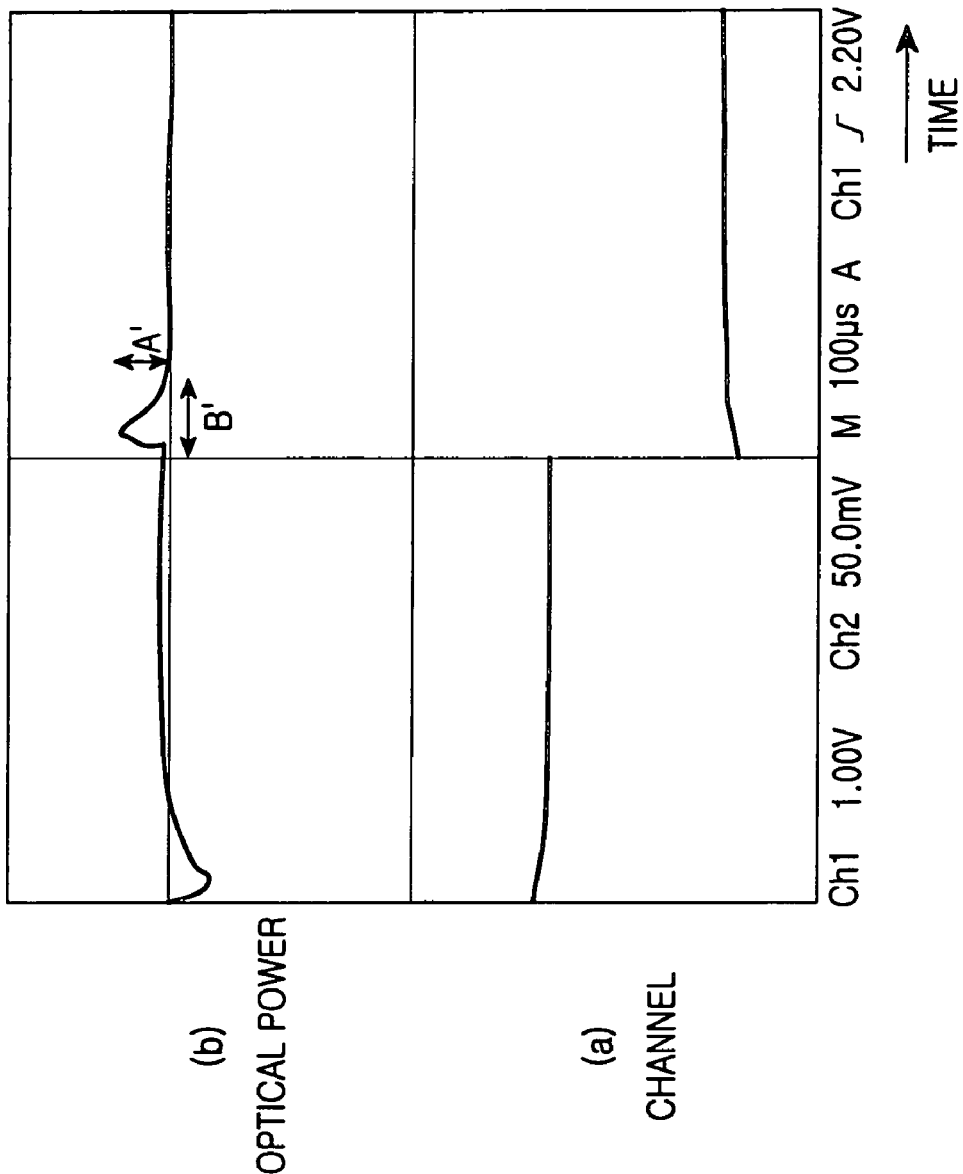
FIG. 8 shows a variation of optical power of an optical fiber amplifier according to the second aspect of the present invention, depending on a change in the quantity of channels being input when a time constant is 10 $\mu$s.

As also shown in FIG. 8, the second pumping light source unit 450 includes a pumping light source 451, a back PD 452, a TIA3 453, a differential amplifier 454, a PI controller 455, an adder 456, and a pumping light source driver 457. The pumping light source 451 transmits both signals fed back from the back PD 452 and output signals of a MCU 441 in the controlling unit 440. The outputs of the adder generate a fixed bias current by means of the PI controller 455. When this fixed bias current is used, a low noise figure (NF) is obtained.

Figure 2:
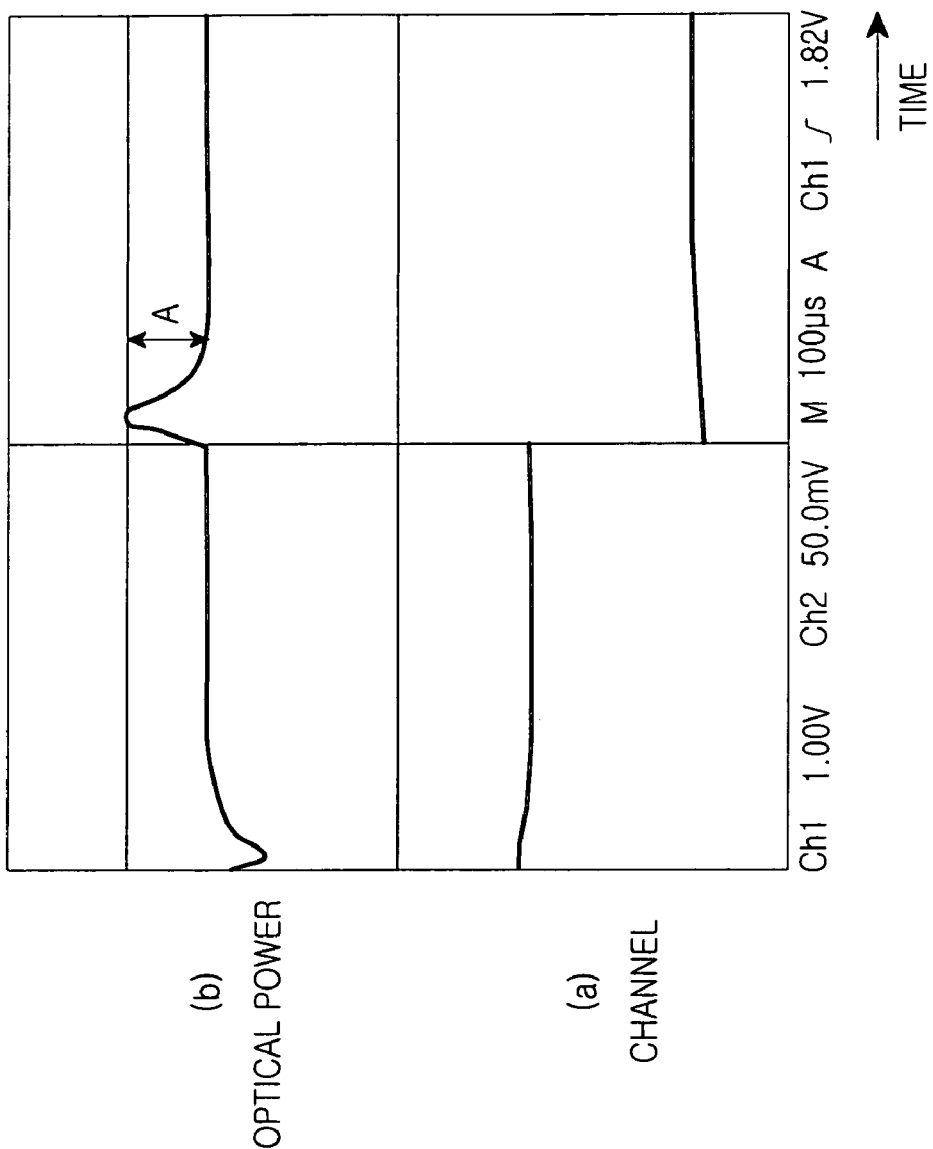
FIG. 2 is a graph of the operation of a prior art device that shows a variation of optical power of the surviving channels in an optical fiber depending on a change in the quantity of channels being input when a time constant is 10 $\mu$s.
Figure 3:
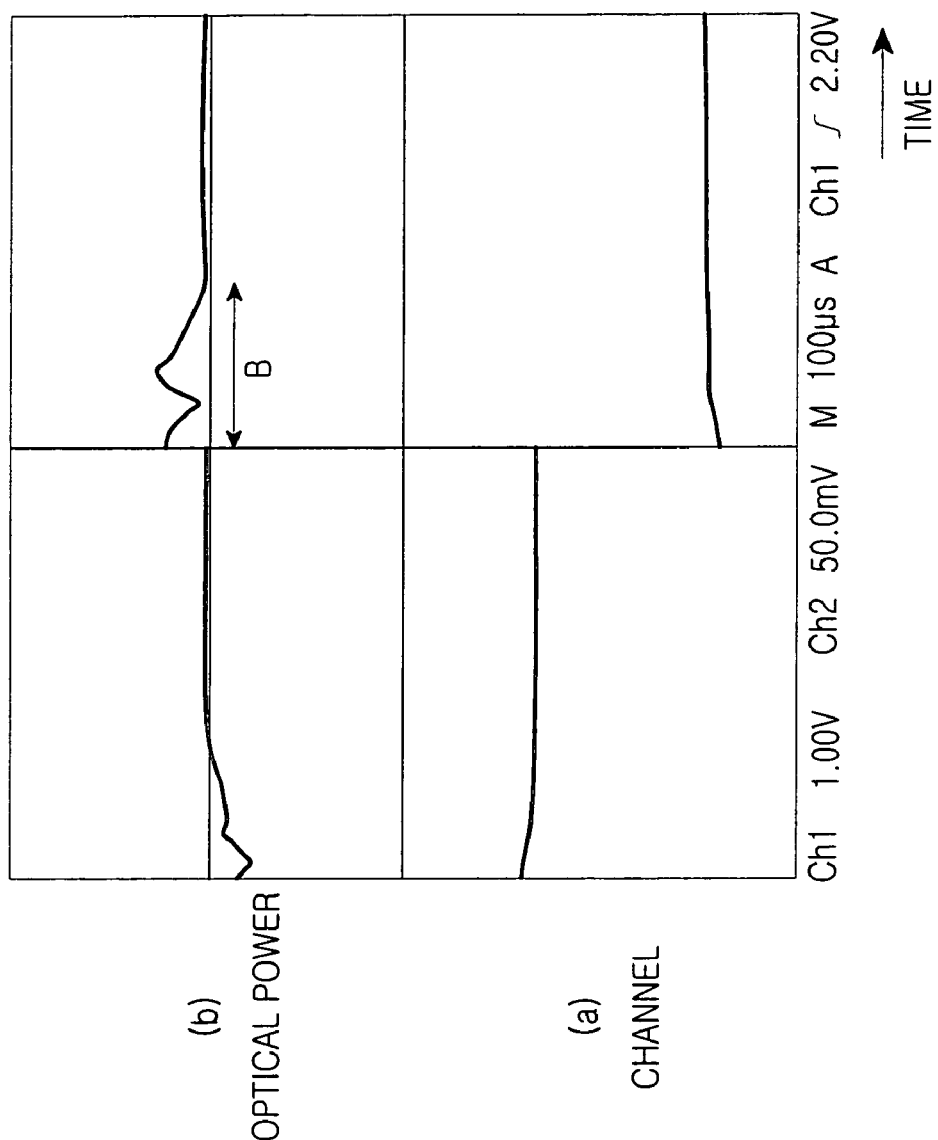
FIG. 3 is a graph of the operation of a prior art device that shows a variation of optical power of the surviving channels in an optical fiber dependent on a change in the quantity of input channels being input when a time constant is 74 $\mu$s.

FIG. 8 shows a variation of optical power of an optical fiber amplifier of the second aspect of the present invention, depending on a change in the number of input channels when a time constant is 10 $\mu$s. As compared with the prior art of FIG. 2, it can be seen that a characteristic of a transient power excursion A' and a transient response time B' are greatly improved in the second embodiment in that both are reduced. Transient excursion power (A') is lower than in FIG. 2 and response time B' is significantly shorter. Thus, the quantity of input channels can be changed with minimal transient excursions and response time disruptions than known in the prior art.

While the invention has been shown and described with reference to certain preferred aspects thereof, it will be understood by one skilled in the art that various modifications may be made therein without departing from the spirit and scope of the invention as defined by the appended claims. Therefore, the scope of the present invention should not be limited to the forgoing embodiments, but defined by the following claims as well as their equivalents.

As mentioned above, the automatic gain controller of the optical fiber amplifier according to the present invention operates the P controller in advance by inputting signals generated from the transient suppressor into the P controller, so that the short time constant determined once can be effectively controlled without a great influence on a transient response characteristic, even though the conditions of the number of the channels inputted into the optical fiber amplifier are varied. Further, even when a change in the number of the channels inputted into the optical fiber amplifier is great or when a change in temperature is generated, an effect caused by ASE power can be compensated, so that an automatic gain control can be implemented within a certain input range.

What is claimed is:

1. An automatic gain controller of an optical fiber amplifier that outputs transient suppressing signals in order to minimize a transient response characteristic, comprising:
   a first opto-electric conversion unit for receiving and converting into a first group of electrical signals a first portion of optical signals input into the optical fiber amplifier and to output the first group of electrical signals;
   a second opto-electric conversion unit for receiving and converting into a second group of electrical signals a first portion of optical signals output from the optical fiber amplifier and to output the second group of electrical signals;
   a transient suppressing unit for generating pulse-type waveforms when a change in channel quantity is generated during monitoring outputs of the first opto-electric conversion unit;
   a comparing unit for comparing the sum of output signals of the transient suppressing unit and output signals of the first opto-electric conversion unit with output signals of the second opto-electric conversion unit;
   a controlling unit for outputting pump control signals in response to the output signals of the transient suppressing unit and output signals of the comparing unit; and
   a first pumping light source unit for supplying pumping light to the optical fiber amplifier in response to the inputting of the pump control signals.

2. The automatic gain controller according to claim 1, wherein the controlling unit comprises:
   a proportional controller for operating in response to the output signals of the transient suppressing unit and the output signals of the comparing unit; and
   an integral controller for operating in response to the output signals of the comparing unit.

3. The automatic gain controller according to claim 2, wherein the output signals of the transient suppressing unit are input into each of the proportional and integral controllers in order to operate the proportional controller without a delay relative to a momentary input change of the optical fiber amplifier.

4. The automatic gain controller according to claim 1, further comprising a second pumping light source unit for providing a fixed bias current to the optical fiber amplifier.

5. The automatic gain controller according to claim 1, further comprising a micro control unit for compensating offsets caused by power of amplified spontaneous emission, depending on a change in input power of the optical fiber amplifier or a change in temperature.

6. The automatic gain controller according to claim 4, further comprising a micro control unit for compensating offsets caused by power of amplified spontaneous emission, depending on a change in input power of the optical fiber amplifier or a change in temperature.

7. An automatic gain controller of an optical fiber amplifier, comprising:
   an optical fiber amplifying unit comprising first and second optical fiber amplifiers for amplifying input optical signals;
   a first opto-electric conversion unit for converting into electrical signals a first portion of input optical signals and to output the electrical signals;
   a second opto-electric conversion unit for converting into electrical signals a first portion of optical signals output from the optical fiber amplifying unit and to output the converted signals;
   a first pumping light source unit for supplying a fixed bias current to the first optical fiber amplifier in response to inputting of pump control signals;
   a transient suppressing unit for generating pulse typed waveforms when a change in channel number is generated during monitoring outputs of the first opto-electric conversion unit;
   a comparing unit that compares the sum of output signals of the transient suppressing unit and output signals of the first opto-electric conversion unit with output signals of the second opto-electric conversion unit;

a controlling unit that controls outputting the pump control signals in response to the output signals of the transient suppressing unit and output signals of the comparing unit; and a second pumping light source unit for providing pumping light to the second optical fiber amplifier in response to the inputting of the pump control signals.

8. The automatic gain controller according to claim 7, wherein the controlling unit comprises:

a proportional controller for operating in response to the output signals of the transient suppressing unit and the output signals of the comparing unit; and an integral controller for operating in response to the output signals of the comparing unit.

9. The automatic gain controller according to claim 8, wherein the output signals of the transient suppressing unit are input into each of the proportional and integral controllers, in order to operate the proportional controller without a delay relative to a momentary input change of the optical fiber amplifier.

10. The automatic gain controller according to claim 7, further comprising a micro control unit for compensating offsets caused by power of amplified spontaneous emission, depending on one of a change in input power of the optical fiber amplifier and a change in temperature.

11. A method for automatic gain control of an optical fiber amplifier that outputs transient suppressing signals in order to minimize a transient response characteristic, comprising the steps of:

(a) converting into a first group of electrical signals a first portion of optical signals input into the optical fiber amplifier and outputting the first group of electrical signals;

(b) converting into a second group of electrical signals a first portion of optical signals output from the optical fiber amplifier and to output the second group of electrical signals;

(c) generating pulse-type waveforms when a change in channel quantity is generated during monitoring outputs of the first group of electrical signals;

(d) comparing the pulse-type waveforms generated in step (c) with the first group of electrical signals from step (a) and the second group of electrical signals from step (b);

(e) outputting pump control signals in response to the comparison performed in step (d); and (f) supplying pumping light to the optical fiber amplifier in response to the outputting of the pump control signals in step (e).

12. The method according to claim 11, wherein the outputting of pump control signals further comprises the sub-steps of:

(i) operating a proportional controller in response to the pulse-type waveforms generated in step (c) and the signals generated in step (d) and output in step (e);

(ii) operating an integral controller in response to the output signals of step (d).

13. The method according to claim 12, wherein the waveforms output in step (c) are used to operate the proportional controller without a delay relative to a momentary input change of the optical fiber amplifier.

14. A method for automatic gain control of an optical fiber amplifier, comprising the steps of:

(a) amplifying input optical signals by an optical fiber amplifying unit comprising first and second optical fiber amplifiers;

(b) converting into electrical signals a first portion of input optical signals and to output the electrical signals by a first opto-electric conversion unit that converts into electrical signals a first portion of input optical signals and to output the electrical signals;

(b) converting into electrical signals a first portion of optical signals output from the optical fiber amplifying unit and to output the converted signals by a second opto-electric conversion unit;

(c) supplying a fixed bias current to the first optical fiber amplifier in response to inputting of pump control signals by a first pumping light source unit;

(d) generating pulse typed waveforms when a change in channel number is generated during monitoring outputs of the first opto-electric conversion unit by a transient suppressing unit;

(e) comparing the sum of output signals of the transient suppressing unit and output signals of the first opto-electric conversion unit with output signals of the second opto-electric conversion unit by a comparing unit;

(f) outputting the pump control signals in response to the output signals of the transient suppressing unit and output signals of the comparing unit by a controlling unit; and (g) providing pumping light to the second optical fiber amplifier in response to the inputting of the pump control signals by a pumping light source unit.

15. The method according to claim 14, wherein the controlling unit comprises:

a proportional controller for operating in response to the output signals of the transient suppressing unit and the output signals of the comparing unit; and an integral controller for operating in response to the output signals of the comparing unit; and the output signals of the transient suppressing unit are input into each of the proportional and integral controllers, in order to operate the proportional controller without a delay relative to a momentary input change of the optical fiber amplifier.

16. The method according to claim 14, further comprising a micro control unit for compensating offsets caused by power of amplified spontaneous emission, depending on one of a change in input power of the optical fiber amplifier and a change in temperature.

* * * * *